(12) United States Patent
Huang et al.

(10) Patent No.: US 7,039,278 B1
(45) Date of Patent: May 2, 2006

(54) SINGLE-FIBER BI-DIRECTIONAL TRANSCEIVER

(75) Inventors: Yonglin Huang, Milpitas, CA (US); Zheng Wang, San Jose, CA (US); Qi Deng, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 5 days.

(21) Appl. No.: 10/617,006

(22) Filed: Jul. 10, 2003

Related U.S. Application Data

(60) Provisional application No. 60/394,774, filed on Jul. 10, 2002, provisional application No. 60/395,413, filed on Jul. 13, 2002, provisional application No. 60/397,969, filed on Jul. 23, 2002, provisional application No. 60/397,971, filed on Jul. 23, 2002, provisional application No. 60/397,967, filed on Jul. 23, 2002, provisional application No. 60/398,056, filed on Jul. 23, 2002, provisional application No. 60/397,851, filed on Jul. 23, 2002, provisional application No. 60/397,728, filed on Jul. 23, 2002, provisional application No. 60/397,970, filed on Jul. 23, 2002, provisional application No. 60/397,852, filed on Jul. 23, 2002, provisional application No. 60/397,963, filed on Jul. 23, 2002.

(51) Int. Cl.
*G02B 6/26* (2006.01)
*G02B 6/42* (2006.01)
*H04B 10/00* (2006.01)

(52) U.S. Cl. ............................ 385/47; 385/11; 385/15; 385/24; 398/125; 398/138; 398/139; 359/484

(58) Field of Classification Search ................. 385/11, 385/15, 24, 47; 398/125, 138, 139; 359/484
See application file for complete search history.

(56) References Cited

U.S. PATENT DOCUMENTS

| | | | |
|---|---|---|---|
| 4,650,289 A * | 3/1987 | Kuwahara | 359/484 |
| 4,911,765 A * | 3/1990 | Song et al. | 148/33.4 |
| 5,642,448 A | 6/1997 | Pan et al. | |
| 6,049,426 A * | 4/2000 | Xie et al. | 359/484 |
| 6,115,516 A | 9/2000 | Watson et al. | |
| 6,178,044 B1 | 1/2001 | Li et al. | |
| 6,282,025 B1 | 8/2001 | Huang et al. | |
| 6,339,661 B1 * | 1/2002 | Kokkelink et al. | 385/11 |
| 6,407,861 B1 | 6/2002 | Zhang et al. | |
| 6,493,141 B1 | 12/2002 | Cao et al. | |
| 6,597,479 B1 * | 7/2003 | Chu et al. | 398/41 |
| 6,636,651 B1 | 10/2003 | Li | |
| 6,795,242 B1 * | 9/2004 | Pan et al. | 359/484 |
| 6,836,575 B1 | 12/2004 | Li | |
| 2002/0126945 A1 | 9/2002 | Konishi et al. | |
| 2002/0168128 A1 | 11/2002 | Chang et al. | |
| 2004/0013368 A1 | 1/2004 | Gilliland et al. | |

OTHER PUBLICATIONS

*Optics*, Eugene Hecht, Figure 8.52, p. 306.

* cited by examiner

*Primary Examiner*—Frank G. Font
*Assistant Examiner*—Ryan Lepisto
(74) *Attorney, Agent, or Firm*—Workman Nydegger

(57) ABSTRACT

An integrated transceiver for achieving bi-directional communication along a single fiber-optic cable in a fiber-optic network. The transceiver includes an active part for transmit and receive portions of the transceiver. The active part includes a photo diode and a laser diode attached to a substrate. Bi-directional communication is achieved by using an optical circulator. The optical circulator may include components that limit back reflections into the active part of the transceiver. The optical circulator is attached to the substrate and connected optically to the active part.

25 Claims, 9 Drawing Sheets

OPTICAL AXIS 0°

OPTICAL AXIS 45°

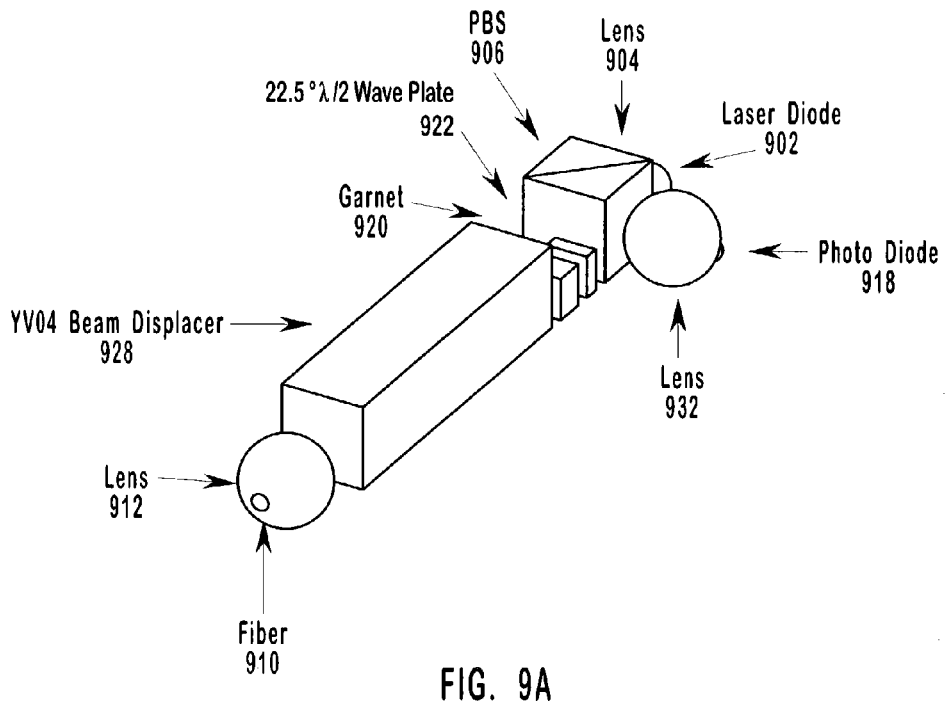
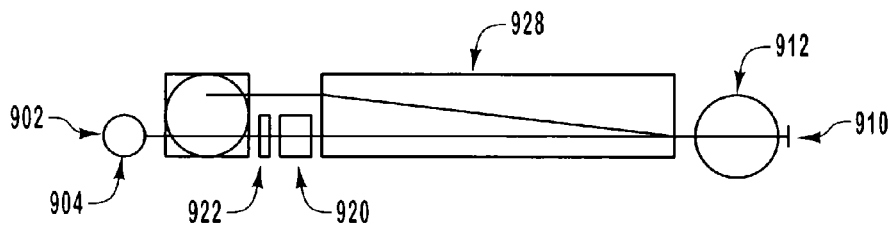
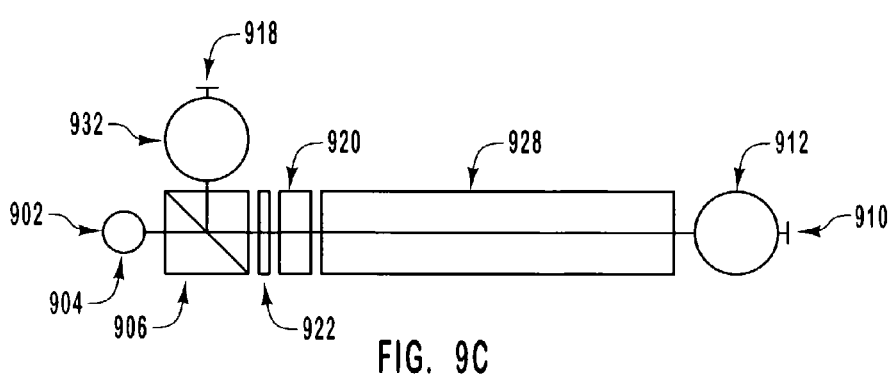

SINGLE-FIBER BI-DIRECTIONAL TRANSCEIVER

CROSS-REFERENCE TO RELATED APPLICATIONS

This application claims priority to and the benefit of U.S. Provisional Patent Applications No. 60/394,774, filed Jul. 10, 2002, entitled Single-Fiber Bi-Directional Transceiver; No. 60/397,969, filed Jul. 23, 2002, entitled Plug-in Module Having a Receptacle for Receiving Bi-Directional Data Transmission, No. 60/397,971, filed Jul. 23, 2002, entitled Plug-in Module Having a Receptacle for Receiving Bi-Directional Data Transmission, No. 60/397,967, filed Jul. 23, 2002, entitled Optical Circulator Using a Prism for Bi-Directional Communication; No. 60/398,056, filed Jul. 23, 2002, entitled Low Cost Optical Circulator for Bi-Directional Communication; No. 60/397,851, filed Jul. 23, 2002, entitled, Optical Circulator with Dual Receive Path for Bi-Directional Communication; No. 60/397,728, filed Jul. 23, 2002, entitled, Optical Circulator with Dual Receive Path and Quarter Wave-Plate for Bi-Directional Communication; No. 60/397,970, filed Jul. 23, 2002, entitled, Optical Circulator with Adjacent Transmit and Receive Ports for Bi-Directional Communication; No. 60/397,852, filed Jul. 23, 2002, entitled, Optical Circulator with Beam Dispenser for Bi-Directional Communication; and No. 60/397,963, filed Jul. 23, 2002, entitled, Optical Circulator with Beam Dispenser for Bi-Directional Communication; No. 60/395,413, filed Jul. 13, 2002, entitled Optical Pump Module; all of which are hereby incorporated by reference in their entireties.

BACKGROUND OF THE INVENTION

1. The Field of the Invention

The invention generally relates to the field of communication along a fiber-optic channel. More specifically, the invention relates to a device for transmitting data bi-directionally in a single fiber-optic cable.

2. The Relevant Technology

Digital data can be efficiently propagated through a fiber-optic cable using light signals from light emitting diodes or lasers. To send data on a fiber-optic cable, the data is typically converted from electronic data generated by computers to optical data that can be propagated onto the fiber-optic cable. When data is received from a fiber-optic cable, the data must be converted from optical data to electronic data so that it can received by a computer.

To convert electronic data to optical data for transmission on a fiber-optic cable, a transmitting optical subassembly (TOSA) is often used. A TOSA uses the electronic data to drive a laser diode or light emitting diode to generate the optical data. When optical data is converted to electronic data, a receiving optical subassembly (ROSA) is used. The ROSA has a photo diode that, in conjunction with other circuitry, converts the optical data to electronic data. Because most computers both transmit and receive data, most computers need both a TOSA and a ROSA to communicate through fiber-optic cables. A TOSA and ROSA can be combined into an assembly generally referred to as a transceiver. Current transceiver designs are accomplished by integrating a discrete TOSA with a discrete ROSA. Transceiver designs using discrete components suffer from drawbacks such as increased overall packaging, increased size, increased cost, decreased yield, and the like.

The transceiver typically accomplishes bi-directional communication through the use of two fiber-optic cables. A first cable is used to transmit data and a second cable is used to receive data. It is often desirable to limit the number of fiber-optic cables between two communication points to save on material costs and installation. One method of limiting the number of cables is by both sending and receiving data on the same fiber-optic cable, which is possible because of the directional nature of an optical signal that is propagated along a fiber-optic cable. Generally, achieving bi-directional communication on a single fiber-optic cable is done through the use of splitters or circulators.

A common splitter design is shown in FIG. 1. Splitter 100 includes input ports and output ports. As shown in FIG. 1, these ports are represented by pigtail leads. Pigtail 102 represents the transmission line of a communications transceiver. Pigtail 104 represents the receive line of the communications transceiver. Pigtail 106 is a fiber-optic cable to the communications network. Commonly, a transceiver sends optical signals through the transmission pigtail 102. The optical signal travels to a splitter plate 108, which splits the optical signal in two directions. In one example, approximately half of the optical signal is sent towards the decimation path 112. The remaining portion of the optical signal is propagated into the pigtail 106. Data being received by the splitter 100 travels through the pigtail 106 into the splitter 100. The splitter plate 108 reflects half of the light to the decimation path 112 and half of the light to the reflector 110. The reflector 110 reflects all of the light towards the reception pigtail 104. Any light reflected to the decimation path 112 is usually lost.

A 3 dB decimation represents approximately a half power drop at the splitter plate 108. Using a splitter to achieve bi-directional communication often results in reduced optical power. Some splitters, for example, experience around a 3 dB drop in power. For a transceiver pair (i.e. a transceiver at a first computer and a transceiver at a second computer that communicates with the first computer), the use of splitters may result in a loss of approximately 6 dB.

Another method of bi-directional communication along a single fiber-optic cable involves the use of optical circulators. An optical circulator is generally a device having three or more ports, by which optical data input into one port is output at the next port. When light is transmitted bi-directionally, a transceiver TOSA portion transmits optical data to port 1 where it is propagated onto the fiber-optic network at port 2. Optical data from the fiber-optic network comes through port 2 and is output to port 3 where the ROSA portion of the transceiver receives the optical data.

One drawback of using a conventional circulator for this type of communication is that such circulators are relatively expensive. Optical circulators are generally constructed using discrete components and each of these components typically has its own individual packaging and interfaces that need to be dealt with when they are combined together to form a circulator. Moreover, to enable such conventional circulators to be used in this way, there is a need to avoid significant near end back-reflection. In particular, the connectors need to be well connected and the back-reflection needs to be less than −35 dB in one example.

Although conceptually bi-directional communication can be accomplished using discrete transceivers and circulators or splitters, there are no such designs that package the circulator or splitter into a compact module as part of a transceiver. Thus, discrete components must be used. As such, it is not possible to reduce the overall packaging, decrease the overall footprint of the transceiver and circulator combination, reduce component count, increase yield, etc. An integrated transceiver design that allowed for bi-directional communication along a single fiber-optic cable would be beneficial.

BRIEF SUMMARY OF THE INVENTION

These and other limitations are overcome by the present invention which relates to an integrated optical transceiver for transmitting and receiving optical data bi-directionally over a single optical fiber. In one embodiment, an active component part including a laser diode and a photo diode is attached to a substrate. A circulator is attached to the substrate and optically coupled to the active component part. Advantageously, the integrated device allows reduced component count and manufacturing time, a smaller size, and a lower cost.

The active component part of the transceiver (such as the laser diode and the photo diode) may be included within the same subassembly. The active component part may be fabricated in a single substrate monolithically or fabricated separately and then bonded to a common substrate. The active components may also be integrated with passive components such as lenses and/or the circulator in the same subassembly. The circulator redirects the optical data or optical beams separately for the transmitter and the receiver. The circulator also has an isolation function that enhances stability by preventing optical energy entering the transceiver from falling on the active area of the transmitter. This using a circulator to connect a single fiber to the active component part permits the transceiver to be used for single fiber bi-directional communications.

In another aspect of the invention, the transceiver may meet one or more industry standards, in whole or in part, that allows it to be interoperable with commercially available devices ordinarily configured for use with conventional, dual-fiber modules. Exemplary standards include mechanical dimensions and electrical or optical interfaces. For example, the transceiver may be configured to connect with an existing transceiver that would otherwise require two fiber optic fibers.

These and other features of the present invention will become more fully apparent from the following description and appended claims, or may be learned by the practice of the invention as set forth hereinafter.

BRIEF DESCRIPTION OF THE DRAWINGS

The appended drawings contain figures of embodiments of the present invention. The above-mentioned features of the invention, as well as other features, will be described in connection with the embodiments. However, the illustrated embodiments are only intended to illustrate embodiments of the invention and not limit the invention. The drawings contain the following figures:

FIGS. 9A, 9B and 9C illustrate an alternate embodiment of the core and lenses in an integrated circulator.

DETAILED DESCRIPTION OF THE PREFERRED EMBODIMENTS

Single fiber bi-directional communication enhances data transport capacity by using one fiber instead of two fibers. The present invention relates to systems and methods for converting a conventional two fiber bi-directional system into a single fiber bi-directional communication system and to systems and methods for transmitting and receiving optical data bi-directionally over a single fiber optic cable. Reference will now be made to the drawings to describe the invention. It is to be understood that the drawings are diagrammatic and schematic representations of certain embodiments, and are not limiting of the present invention, nor are they necessarily drawn to scale.

Figure 1:
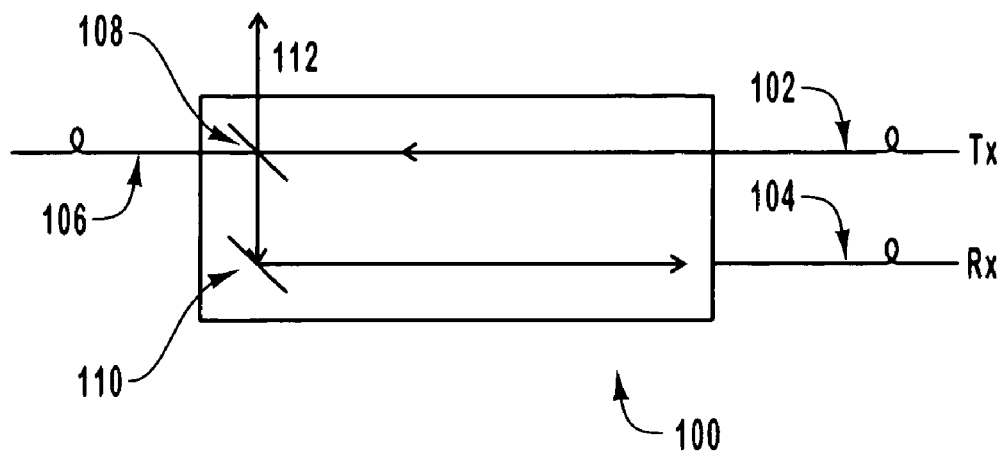
FIG. 1 illustrates a prior art drawing of a splitter commonly used in bi-directional communication.
Figure 2A:
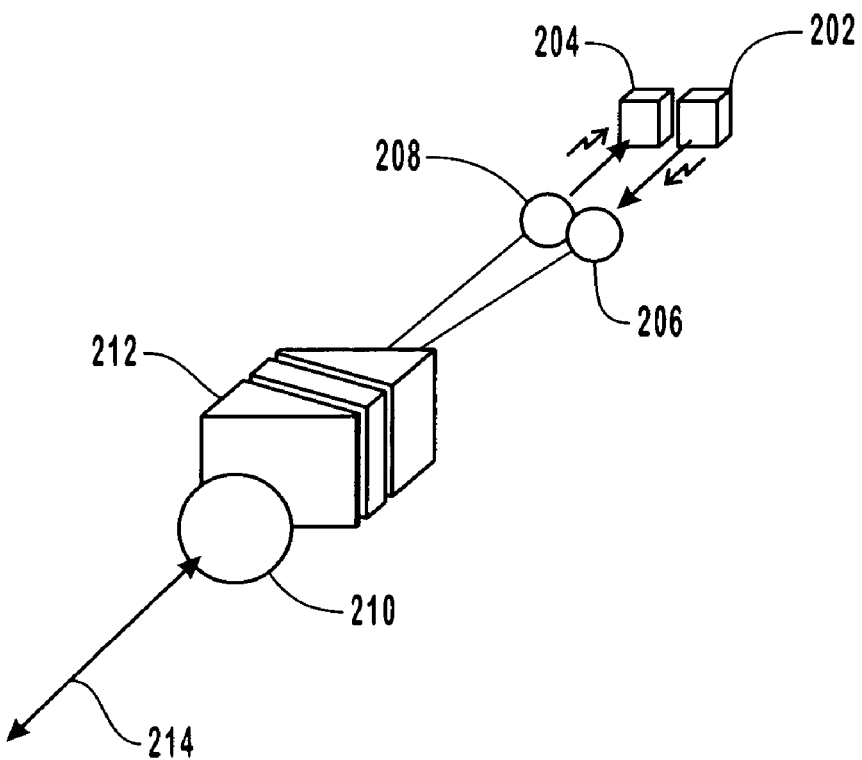
FIG. 2A illustrates an optical transceiver for bi-directional optical communication.

FIG. 2A shows a diagram of some of the active and passive components in the optical path of one embodiment of an optical transceiver for bi-directional communication on a single fiber-optical cable. The active components shown in FIG. 2A are the laser diode 202 and photo diode 204. The passive components shown in FIG. 1 are the optical lenses 206, 208 and 210 and the optical circulator 212.

To transmit optical data the laser diode 202 produces an output light signal in response to a modulated electronic data signal. The output light signal, in some embodiments of the invention, is optically polarized at some predetermined state of polarization (SOP). The SOP may be specified using conventional techniques, such as through the manner of manufacture of the laser diode 202 or by using a wave plate. The output light signal is collimated by a lens 206 and directed into the circulator 212. The circulator 212 directs the output light signal into the single fiber 214 with a lens 210.

To receive optical data, an input light signal that may be at any SOP travels from the single fiber 214. The lens 210 focuses the input light signal into the circulator 212. The input light signal follows a different path through the circulator than the output light signal of the laser. After passing through the circulator, the input light signal is focused into the active area of the photo diode 204 by the lens 208. The photo diode 208 then converts the input light signal into electronic signals in a conventional manner.

The optical components shown in FIG. 2A may be included in the same subassembly. There are many standard packages for optical components that could be used, such as the various transistor outline (TO) packages or a fiber couple array (FCA) package. Alternatively, the active components and the passive components may be packaged separately. Within the transceiver, the components could then be fiber fused together or aligned in a free space arrangement.

Figure 2B:
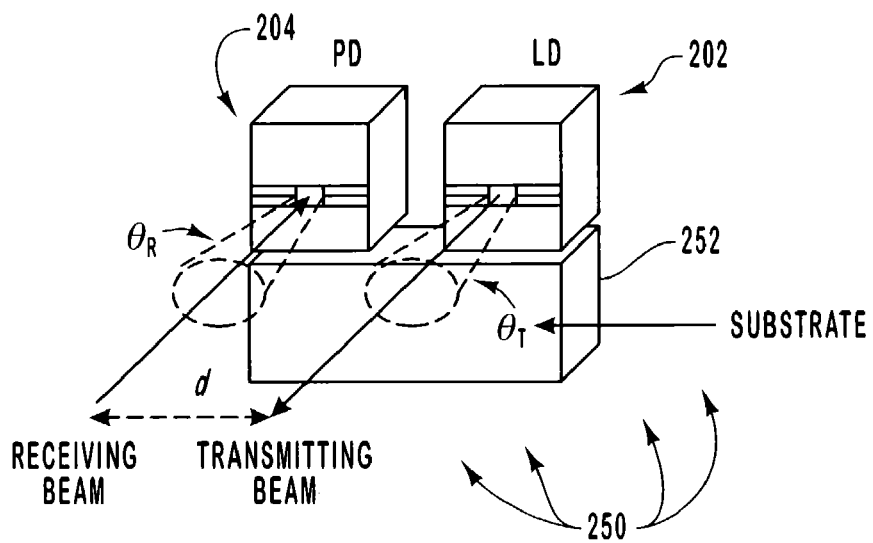
FIG. 2B illustrates an active component for use in some embodiments of the present invention for practicing certain aspects of the present invention.

An embodiment of an integration of the active components of the optical transceiver is shown in FIG. 2B as an active component part 250. The active component part 250 comprises two basic elements: a laser diode 202 for the transmitter and a photo diode 204 for the receiver. The exemplary active component part 250 can be fabricated in many ways. One approach is to fabricate the laser diode and the photo diode on the same substrate 252 monolithically. Because the operation of both the laser diode and the photo diode depends on common physical principles, they can be designed and fabricated using the same material and processes. This offers one or more advantages, such as a simplified fabrication process, increased reliability from having fewer individual bonding joints, less cost by using fewer bonding and packing processes, and a small device footprint.

Another approach is to fabricate the laser diode 202 and the photo diode separately 204, and then bond them to the same substrate 252 or carrier. This offers advantages such as being able to take advantage of conventionally manufactured optical components available at low cost.

However the active component part 250 is realized, the mechanical and optical configuration of the transmitting and receiving devices should be chosen to match the requirements of the miniature optical circulator. For example, the distance d between the photo diode 204 and laser diode 202, the receive angle $\theta_R$ and the transmit angles $\theta_T$ of the receiving beam and the transmitting beam respectively should be configured to maximize the coupling efficiency into and from the circulator 212.

Figure 2C:
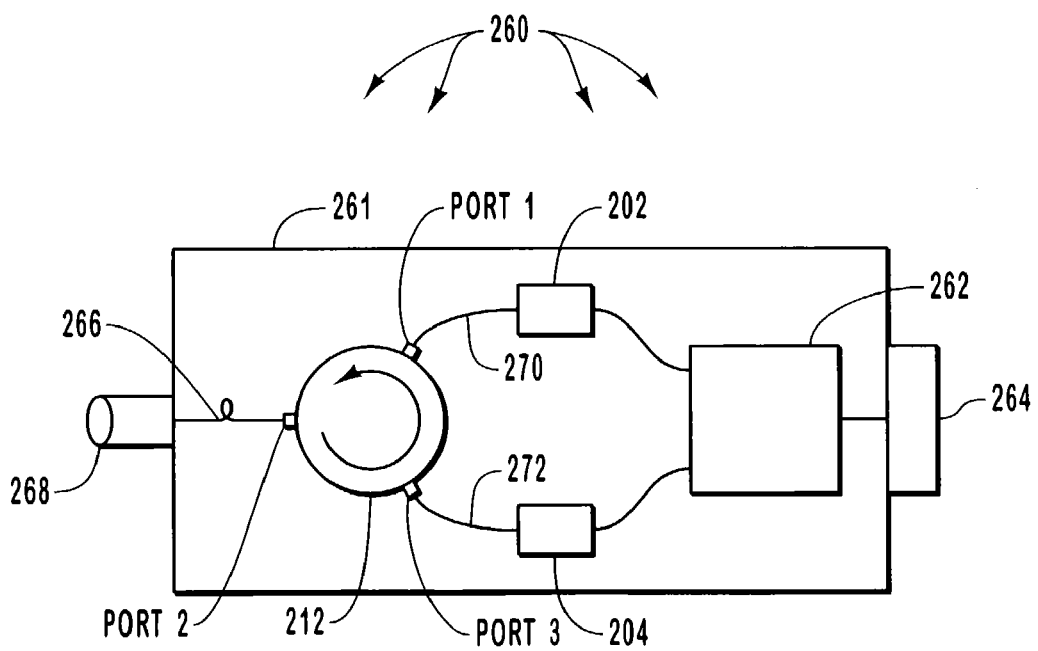
FIG. 2C illustrates another embodiment of an optical transceiver for bi-direction optical communication.

Referring now to FIG. 2C, one embodiment of the invention embodied as a packaged transceiver module 260 with interfaces for connection to other fiber-optic components is shown. The transceiver module 260 is packaged in a module casing 261. Packaged transceiver module 260 comprises a photo diode 204 and a laser diode 202. The photo diode 204 and laser diode 202 are implemented such as described above in connection with FIGS. 2A and 2B. For example, in one embodiment of the invention, the laser diode 202 is coupled through a polarization maintaining fiber-optic pigtail 270 into port 1 of the circulator 212. The photo diode 204 is coupled through a pigtail 272. Other embodiments of the invention couple the circulator 212 and the photo diode 204 and laser diode 202 through free space or other fiber types including single mode fibers, graded index fibers, and the like.

In the embodiment of the invention shown in FIG. 2C, the laser diode 202 is operatively coupled to an electronic interface 262 that comprises electronic circuitry for converting electronic data into a driving signal to drive the laser diode to produce optical data. The electronic interface 262 is further coupled to the photo diode 204 such that electrical pulses produced by the photo diode 204 when optical data contacts the photo diode may be converted to electronic data. In one embodiment of the invention, the electronic interface 262 is for converting to and from electronic data that is of a particular communications standard or protocol. For example, in one embodiment of the invention, the protocol may be that of the 10 Gigabit Ethernet standard.

The electronic interface may be further connected to an electronic connector 264. The electronic connector 264 may be configured in some embodiments of the invention to connect to standard interfaces.

As noted above, port 2 of the optical circulator 212 is used to communicate on a single fiber bi-directional fiber-optic network. For ease of interface, port 2 of the optical circulator may be connected such as through a fiber-optic pigtail 266 to a fiber-optic connector 268. In some embodiments of the invention the fiber-optic connector is of a standard form factor commonly used in fiber-optic communication. Such form factors may include but are not limited to small form factor, small form factor pluggable, and Gigabit Interface Converter (GBIC), etc. Other form factors or custom form factors although not enumerated here may also be used to effectively implement the invention.

In another embodiment, the circulator 212 is an isolator. In this embodiment, the isolator has three ports. However, light received through the fiber connected with the pigtail 266 is directed to the photodiode 204. In other words, the laser diode 202 is isolated from received light and the received light is directed to the photo diode 204. Light can be transmitted bidirectionally over a single fiber optic cable.

In addition, the photodiode 204 and the laser diode 202 are disposed on a substrate. The distance between the photodiode and the laser diode 202 can be controlled. In one embodiment, the distance is about 200 microns. One of skill in the art can appreciate the distance can be greater or shorter. By making the distance shorter, an overall length of the transceiver module can be similarly shorted. In one embodiment, the length is about 0.5 inches. One of skill in the art, however, can appreciate that the length can be greater or shorter. A shorter length, however, reduces cost, results in a smaller module footprint, and the like.

Thus, the distance between the laser diode 202 and the photodiode 204 can impact the overall length of the transceiver module. The distance is affected because the core of the circulator or isolator included in the transceiver module causes light to follow a first path in a transmit direction and a second path in a receive direction. In the core, these paths diverge. Hence, if the distance between the photodiode and the laser diode is relatively large, then the transceiver module must have a length sufficient to accommodate the first path and second path of the light. Shortening the distance between the photodiode and the laser diode permits the active component part to be placed near the core and results in the transceiver module having a shorter length.

Figure 5:
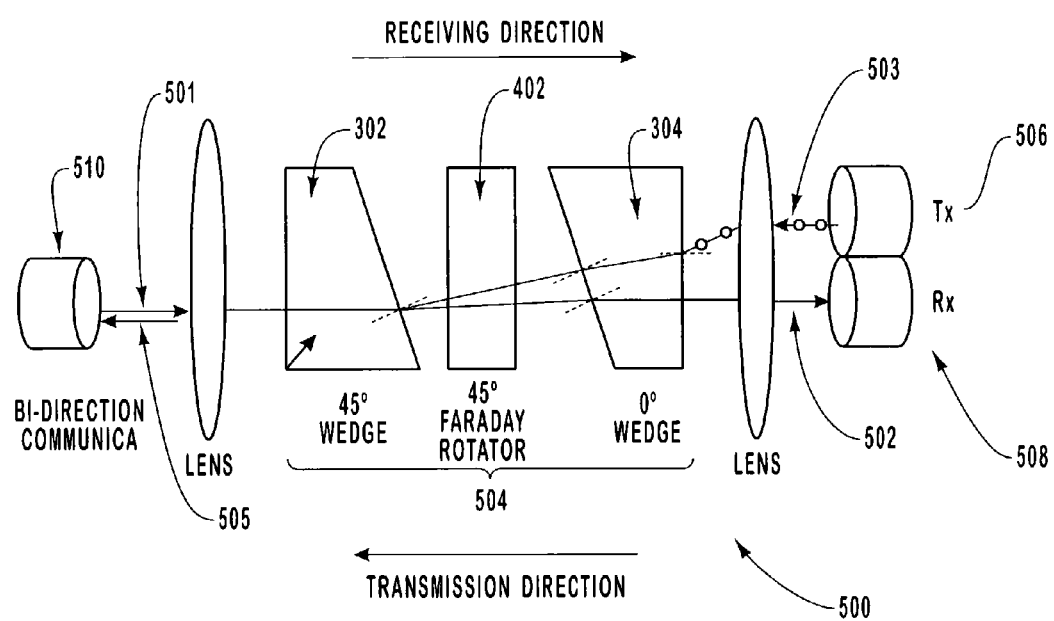
FIG. 5 illustrates an alternate embodiment of the core, lenses, and optical fibers in a low-cost integrated circulator.

Referring now to FIG. 5, a circulator design useful for practicing some aspects of the present invention is shown. Circulator 500 may be integrated with the active component 250 (shown in FIG. 2B) to create a transceiver for bi-directional communication along a single optical fiber. The circulator 500 may have a transmit fiber 506 that is polarization maintaining (PM) and a receive fiber 508. A network fiber 510 may be coupled to the network end, i.e. the end used for bi-directional communication, of the circulator core 504. While the circulator 500 is shown using pigtails, embodiments of the present invention may also use free space arrangements to couple light from the active component 250 to the optical circulator. Light from the transmit fiber 506 is transmitted with a well-maintained SOP to pass through the core and be output to the network fiber 510. Simultaneously, or in some embodiments of the invention at different times, light from the optical network is transmitted from the network fiber 510 with any state of polarization through the optical circulator where it is output at the receive fiber 508.

Referring to FIGS. 3A, 3B, 4A, 4B, and 5 a circulator core 504 is constructed using a conventional Polarization Beam Splitter (PBS) that includes, for example, Wollaston, Rochon, Glan-Thompson or Glan-Taylor prisms 302, 304, or even thin film cubes. These types of prisms are well known and widely used in optics, laser optics, and medical optics. All conventional PBSs are optically isotropic.

The core may also include a Faraday rotator 402 that in one embodiment of the invention is a yttrium iron garnet (YIG) crystal. The Faraday rotator 402 may be latching magnetic material or non-latching magnetic material. For a non-latching material, an external magnet may be used to apply a magnetic filed while a latching material does not need an external magnetic field. In one example, when the bi-directional communications transceiver is intended to be used in an environment with stray magnetic fields, a non latching material design may be preferable as the external magnets will be better able to control the polarization changes of light traveling within the circulator core. This is true because the external magnets exert a stronger magnetic field on the light than the stray magnetic influences. If designs using a latching material were placed in an environment containing stray magnetic fields, the stray magnetic fields may cause a polarization shift in the light traveling in the circulator core.

Figure 3A:
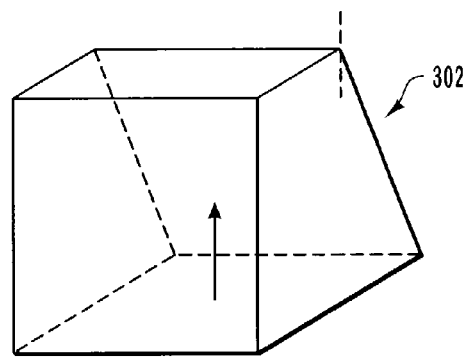
FIG. 3A illustrates a perspective view of one embodiment of an optical birefringent wedge used in the construction of a low-cost circulator.
Figure 3B:
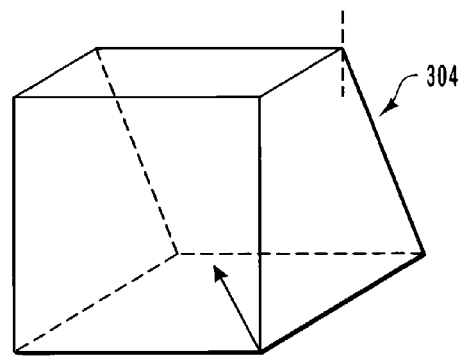
FIG. 3B illustrates a perspective view of one embodiment of an optical birefringent wedge used in the construction of a low-cost circulator.
Figure 4A:
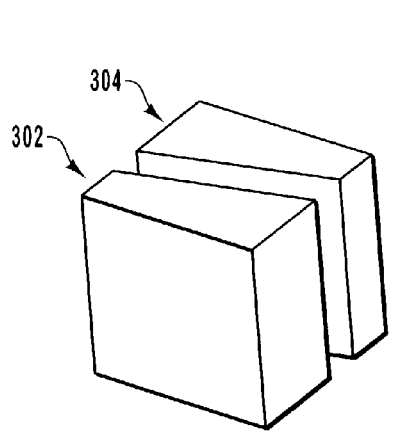
FIG. 4A illustrates a perspective view of a Rochon prism.
Figure 4B:
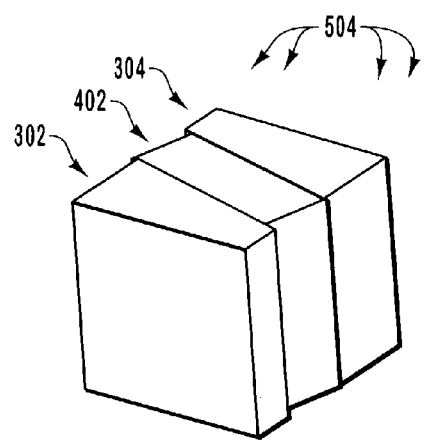
FIG. 4B illustrates a perspective view of an assembly of wedges and a Faraday rotator, sometimes referred to as the core of a circulator.

The circulator design may use two optical birefringent wedges 302, 304. The wedge 302 and wedge 304 are shown in FIG. 3A and FIG. 3B, respectively. Putting these wedges 302, 304 side by side creates a prism similar to the Rochon prism shown in FIG. 4A. To cause this prism to be optically non-reciprocal (meaning that light travels differently in transmit and receive directions), a Faraday rotator 402 is inserted in between the two wedges 302, 304 as shown in FIG. 4B. The ray traces 501, 502, 503 and 505 of this new fiber-optic circulator 500 are shown in FIG. 5 for both transmitting and receiving directions.

In the transmitting direction, a linearly polarized beam from the transmit fiber 506 shown as trace 503 propagates through the optical core 504 and is transmitted into fiber 510 as shown by trace 505. The polarization direction of light 503 is perpendicular to the optical axis of wedge 304. The polarization direction of light 503 may also be parallel to the optical axis of wedge 304. However in the case of parallel polarization, wedge 304 would need to have a 90° optical axis instead of the 0° degree optical axis shown in FIG. 5. After traveling through the Faraday rotator 402, the polarization direction is rotated by 45°, so that the polarization direction is perpendicular to the optical axis of wedge 302. As is true for a Rochon prism, the refractive indices of the beam in the wedge 304 and 302 are different so that the core bends the beam. The angle between the traces 505 and 503, θ is described as follows:

$$\gamma = \arcsin[(n_o - n_e) \cdot \tan \theta], \quad (1)$$

where θ is the wedge angle, and $n_o$, $n_e$, are the refractive indices for the ordinary beam and the extraordinary beam in the two birefringent crystal wedges 302, 304.

In the receiving direction the beam is transmitted from network fiber 510, as shown by trace 501, with any state of polarization. The beam goes through the core 504 as shown by trace 502 and is directed into fiber 508. When the beam goes through the wedge 302, it will be split into two orthogonal polarization components, called the extraordinary (e) beam and the ordinary (o) beam. When these two components pass through the Faraday Rotator 402, both of the two components will be rotated by 45°. When the two components enter the wedge 304, where the optical axis is 45° apart from wedge 302, the e and o beams keep their refractive indices as in wedge 302, so that the output beam 502 is almost parallel to the trace 501 and can only enter fiber 508.

Generally, the physical construction of a circulator such as the one described above or those that are described in the following description is accomplished by attaching discrete optical components onto a substrate material such as glass or polysilicon. The attachment can be accomplished by using epoxy or some other type of glue. Because the circulator uses birefringent crystal components, there is little loss. In one embodiment of the invention, because of the little loss, a 1310 nanometer VCSEL can be used to generate the light pulses that represent the digital data. The invention, however, is not limited to the use of the 1310 nanometer VCSEL. Other types of lasers, such as a 1550 nanometer DFB, may be used, as well as other types of light generators.

FIGS. 6–10 illustrate several different embodiments of the optical circulators of the invention, each having a different set of optical components. Referring now to FIGS. 6A and 6B, one embodiment of the circulator is shown. The light from a laser diode 602 with a well-defined polarization is collimated by a lens 604. In one example, because the SOP of the light is parallel, the light passes through the polarizing beam splitter (PBS) 606 almost without reflection. The light, keeping the same SOP, also passes through the PBS 608 because the garnet 620 changes the SOP of the light in one direction by 45° and a half wave plate 622 changes the SOP of the light in the opposite direction by 45° resulting in no net change of the polarization of the light. Finally the light is coupled into the fiber 610 through the lens 612.

In the reverse optical path, the light from optical fiber 610 at any SOP is collimated by the lens 612. Here it is split into two beams with orthogonal SOPs when it hits the PBS 608. The split beam with a vertical SOP is reflected by the PBS 608. It then propagates through the garnet 614 and is reflected back by a mirror 616 so as to propagate through the garnet 614 again. Its SOP is rotated by the garnet 614 twice in the same direction so that the SOP is changed to horizontal, and the beam passes through the PBS 608 without reflection. Finally, it is focused onto a photodiode 618 by a lens 623.

The second split beam with horizontal SOP propagates through the PBS 608. The SOP of the second split beam changes its SOP to vertical after it travels through the garnet 620 and the half plate wave plate 622 because the garnet 620 and wave plate 622 each rotate the SOP by 45° in the same direction for a total rotation of 90°. The second split beam is reflected by the PBS 606 into the mirror 624 where it is then reflected back. The light continues to propagate through the garnet 620 and wave plate 622. The SOP will be rotated by the garnet 620 by 45° in one direction and by the waveplate 622 45° in the opposite direction resulting in no net change such that the SOP remains vertical. Finally, the second split beam is reflected by the PBS 608 and focused onto the photodiode 618 through lens 623.

Figure 6A:
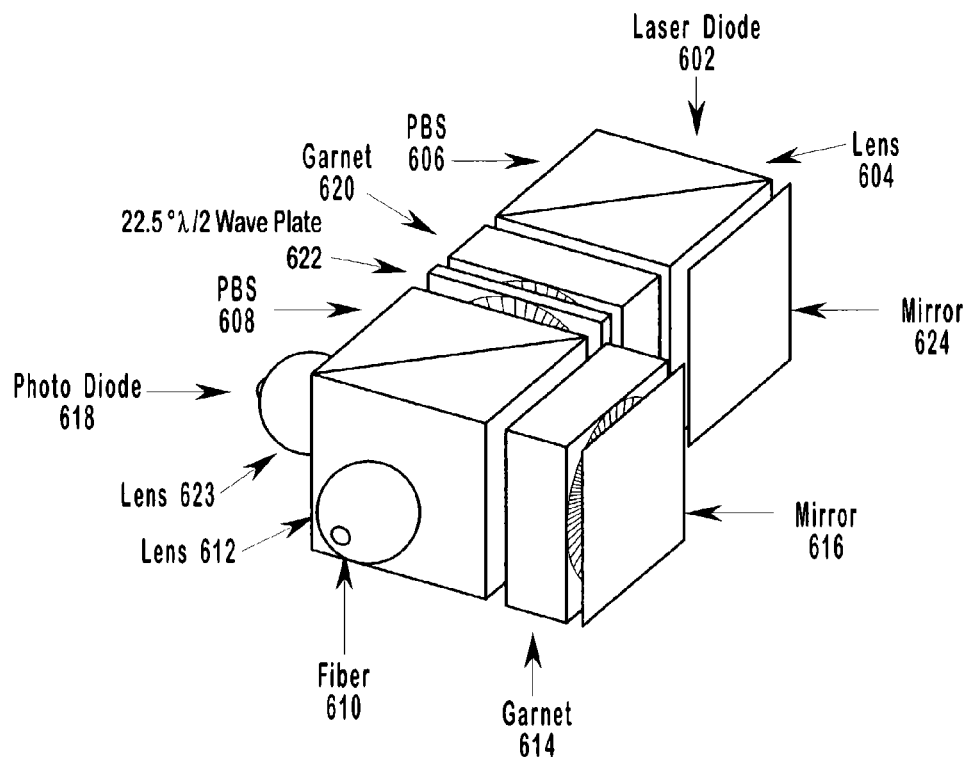
FIGS. 6A and 6B illustrate an alternate embodiment of the core and lenses in an integrated circulator.
Figure 6B:
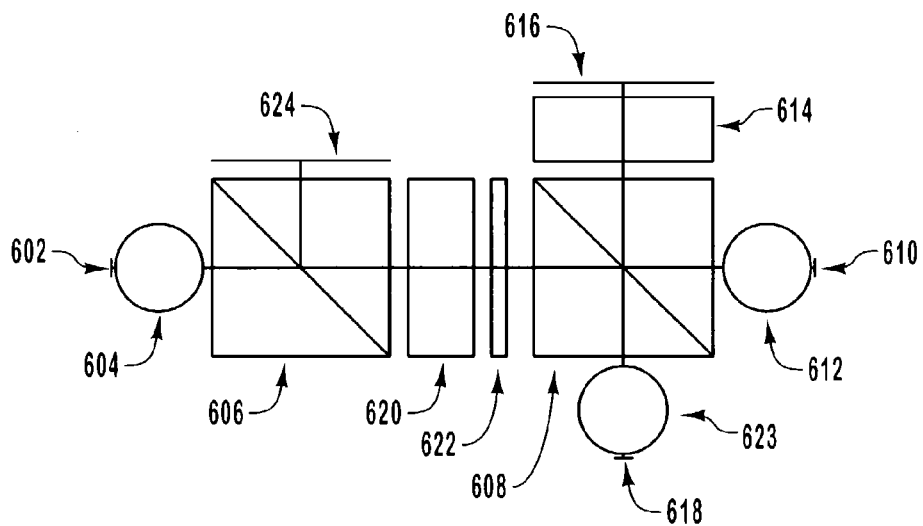
Figure 7A:
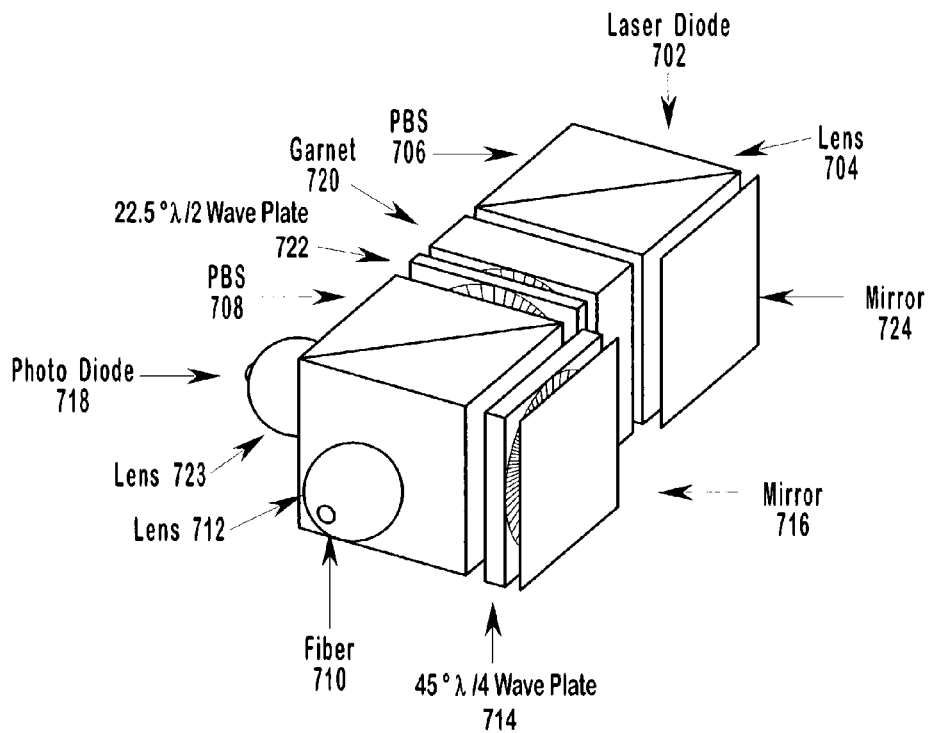
FIGS. 7A and 7B illustrate an alternate embodiment of the core and lenses in an integrated circulator.
Figure 7B:
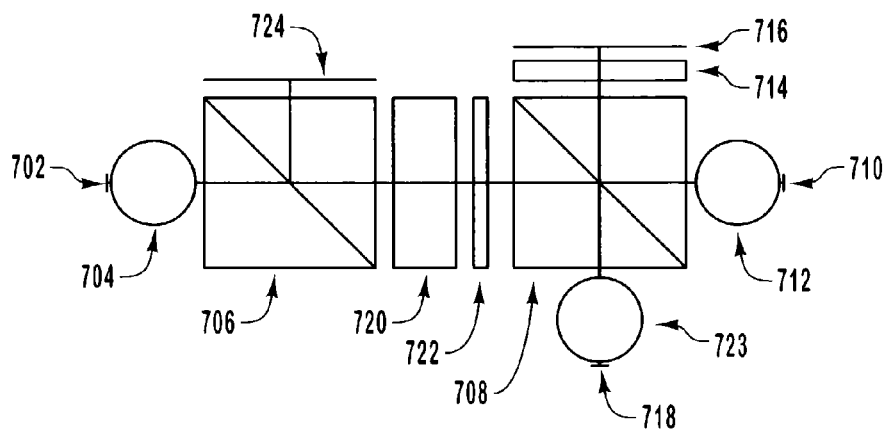

FIGS. 7A and 7B illustrate an alternative embodiment that is similar to the embodiment of FIGS. 6A and 6B. One major difference is that the garnet 614 of FIGS. 6A and 6B is replaced with a 45° quarter wave plate 714 as shown in FIG. 7. In this embodiment, when the beam from the fiber 710 is split in two by a PBS 708, the beam with a vertical SOP is reflected. The reflected beam propagates through the wave plate 714 and is reflected by the mirror 716. The beam then propagates again through the quarter wave plate 714, where its SOP changes to horizontal so that it can pass through the PBS 708.

Figure 8A:
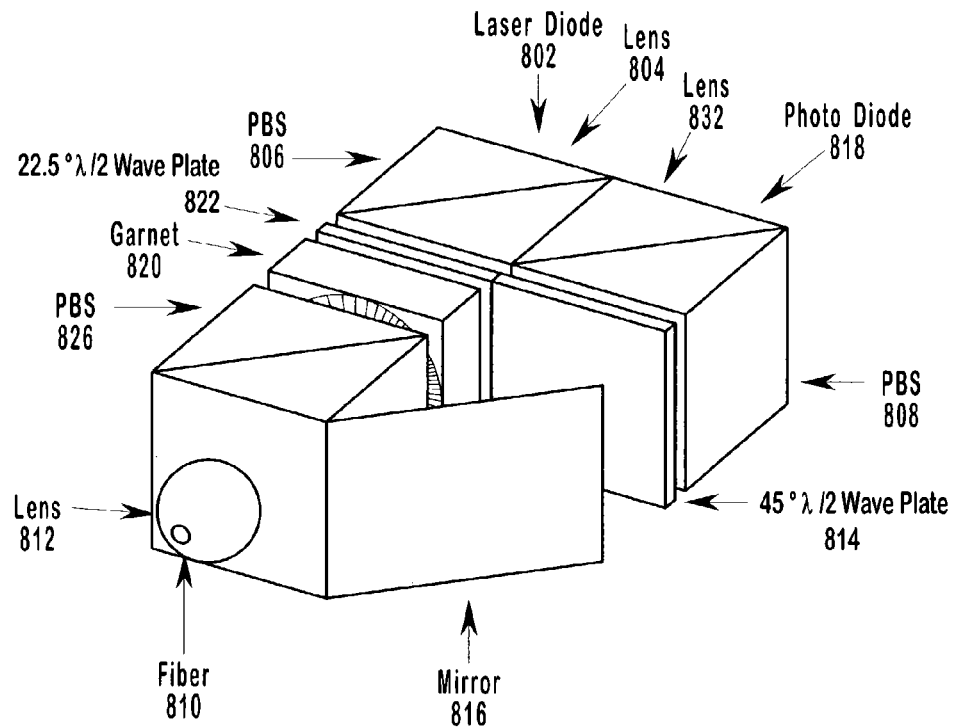
FIGS. 8A and 8B illustrate an alternate embodiment of the core and lenses in an integrated circulator.
Figure 8B:
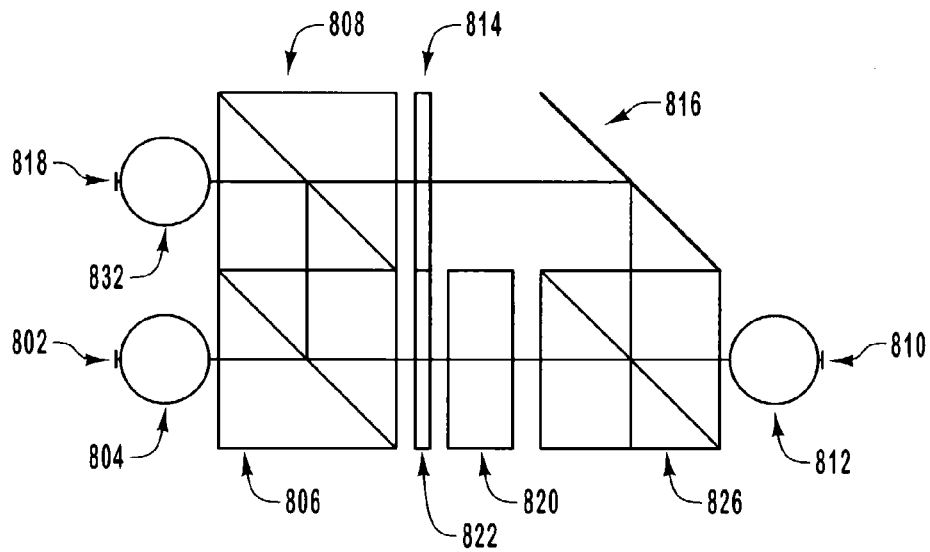

FIGS. 8A and 8B illustrate yet another alternate embodiment of the present invention. The light propagation from the laser diode 802 to the fiber 810 is the same as previously shown in FIGS. 6A through 7B. The light propagation from the fiber 810 to the photodiode 818 takes two different paths. The beam with a horizontal SOP propagates in the same manner as previously described namely that it passes through the PBS 826, the garnet 820 and the wave plate 822. Because the propagation is in the reverse direction, the garnet 820 and half wave plate 822 each change the polarization direction by 45° in the same direction so that the polarization direction is changed from horizontal to vertical after the half wave plate 822. The beam is then reflected by PBS 806 and by PBS 808 to enter Photo Diode 818. For the beam with a vertical SOP, the beam is reflected by the PBS 826 and the mirror 816. The beam then propagates through the 45° quarter wave plate 814 where its SOP is changed to horizontal. This beam then passes through PBS 808 and is focused onto the photodiode 818 by the lens 832.

FIGS. 9A, 9B, and 9C illustrate yet another embodiment. The light from the laser diode 902 with a well-defined linear polarization, for example polarized in the horizontal direction, passes through the PBS 906 without reflection and then through the half wave plate 922 and the garnet 920. The wave plate 922 and the garnet 920 each rotate the polarization direction of the beam by 45° but in opposite directions such that the polarization of the beam remains horizontal. The light then passes through the beam displacer 928. The beam displacer 928 is designed such that a horizontally polarized beam acts like an o (ordinary) beam and a vertically polarized beam acts as an e (extraordinary) beam and is bent. Therefore the light from the laser diode 902 is directly coupled into the optical fiber 910 through lens 912.

In the reverse optical direction, light from the fiber 910 is split into two beams with orthogonal SOPs by the beam displacer 928. The beam with vertical polarization from the beam displacer 928 is bent so that it hits the PBS 906 without hitting the garnet 920 and wave plate 922. Then it is directly reflected by the PBS 906 and focused onto the photodiode 912 by the lens 932. The beam with horizontal polarization propagates through the garnet 920 and half wave plate 922 with its SOP rotated by 90° because the garnet 920 and the half wave plate 922 each rotate the polarization direction of the light by 45° in the same direction. This beam is then reflected by the PBS 906 and focused onto the photodiode 912 by the lens 932.

Figure 10A:
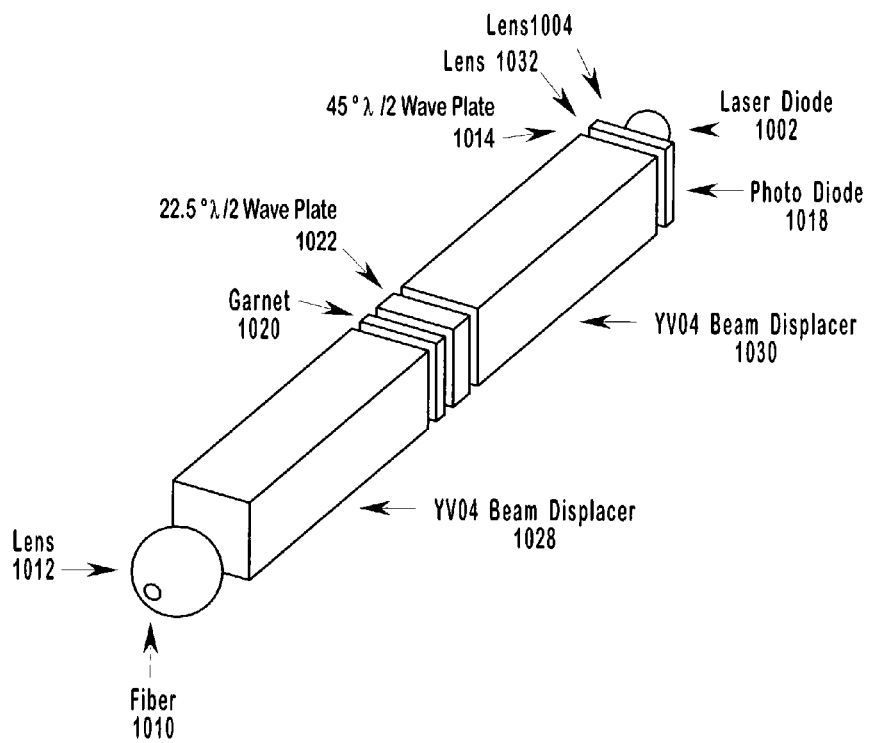
FIGS. 10A and 10B illustrate an alternate embodiment of the core and lenses in an integrated circulator.
Figure 10B:
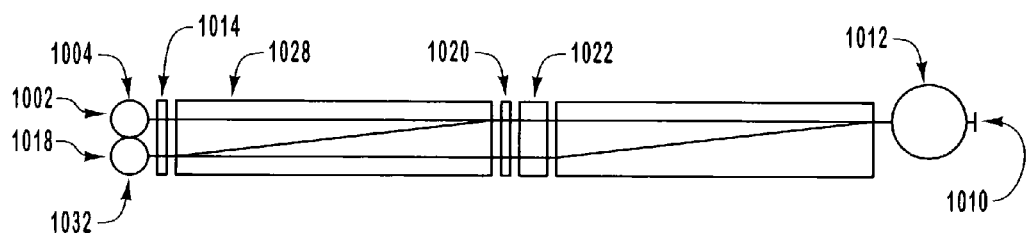

Yet another embodiment is shown in FIGS. 10A and 10B. The light from the laser diode 1002 with well defined polarization direction, for example horizontal polarization, propagates through a 45 degree half wave plate 1014 that changes its SOP to vertical, such that the beam passes straight through the beam displacer 1030, the 22.5 degree half wave plate 1022, the garnet 1020 and the beam displacer 1028. The garnet 1020 and half wave plate 1022 each change the SOP of this beam by 45° but in opposite directions such that the SOP remains vertical. The beam is then coupled into the fiber 1010. If the light from the laser diode has a vertical SOP, the first 45° half wave plate 1014 can be eliminated. In the reverse optical direction, light from the fiber side is split into two parallel beams with orthogonal SOPs, vertical and horizontal, after it propagates through the beam displacer 1028. Both beams rotate their SOPs 90° after they pass through the garnet 1020 and the 22.5° half wave plate 1022. They are combined as one beam with a shifted distance after they propagate through the beam displacer 1030. The combined beam is then focused onto the photodiode 1018 by the lens 1032.

The present invention may be embodied in other specific forms without departing from its spirit or essential characteristics. The described embodiments are to be considered in all respects only as illustrative and not restrictive.

What is claimed is:

1. A transceiver module for both transmitting and receiving optical data over single fiber-optic cable in a fiber-optic network, the transceiver module comprising:
   a substrate;
   an active component part comprising a laser diode and a photo diode disposed on the substrate; and
   a circulator disposed on the substrate and optically coupled to the active component part, the circulator having a first port optically coupled to the laser diode, wherein optical data input at the first port is output at a second port, the second port for transmitting and receiving optical data from the fiber-optic network, where optical data input at the second port is output at a third port that is optically coupled to the photo diode, the circulator further including:
   a plurality of polarization beam splitters;
   a plurality of garnets in optical communication with the plurality of polarization beam splitters;
   at least one waveplate in optical communication with the plurality of polarization beam splitters and the plurality of garnets; and
   at least one mirror in optical communication with the plurality of polarization beam splitters, the plurality of garnets and the at least one waveplate.

2. The transceiver module set forth in claim 1, the active part being monolithically formed on the substrate.

3. The transceiver module set forth in claim 1, the active part comprising a discrete laser diode and a discrete photo diode bonded to the substrate.

4. The transceiver module set forth in claim 1, the active part being bonded with epoxy to the substrate.

5. The transceiver module set forth in claim 1, the active part coupled to the circulator through free space.

6. A transceiver module for both transmitting and receiving optical data over single fiber-optic cable in a fiber-optic network, the transceiver module comprising:
   a substrate;
   an active component part comprising a laser diode and a photo diode disposed on the substrate; and
   a circulator disposed on the substrate and optically coupled to the active component part, the circulator having a first port optically coupled to the laser diode, wherein optical data input at the first port is output at a second port, the second port for transmitting and receiving optical data from the fiber-optic network, where optical data input at the second port is output at a third port that is optically coupled to the photo diode, the circulator further including:
   a polarization beam splitter;
   a waveplate optically coupled to the polarization beam splitter;
   a garnet optically coupled to the waveplate; and
   a beam displacer optically coupled to the garnet.

7. The transceiver module set forth in claim 6, the active part coupled to the circulator through at least one fiber-optic pigtail, the laser diode being coupled to the circulator through a polarization maintaining fiber.

8. The transceiver module set forth in claim 6, the second port optically coupled to an output connector.

9. The transceiver module set forth in claim 8, the output connector being at least one of small form factor, small form factor pluggable, and GBIC.

10. The transceiver module set forth in claim 9 further comprising an electronic interface coupled to the laser diode and the photo diode, the electronic interface comprising circuitry for converting electronic data signals into a driving signal for driving the laser diode and for converting signals from the photo diode to electronic data signals.

11. The transceiver module set forth in claim 10 the electronic data signals being 10 Gigabit Ethernet.

12. A transceiver module for both transmitting and receiving optical data over single fiber-optic cable in a fiber-optic network, the transceiver module comprising:
- a substrate;
- an active component part comprising a laser diode and a photo diode disposed on the substrate; and
- a circulator disposed on the substrate and optically coupled to the active component part, the circulator having a first port optically coupled to the laser diode, wherein optical data input at the first port is output at a second port, the second port for transmitting and receiving optical data from the fiber-optic network, where optical data input at the second port is output at a third port that is optically coupled to the photo diode, the circulator further including:
- a first waveplate;
- a first beam displacer optically coupled to the first waveplate;
- a second waveplate optically coupled to the first beam displacer; and
- a second beam displacer optically coupled to the second waveplate.

13. In an optical network environment, a method of fabricating a bi-directional transceiver module, the method comprising:
- providing a substrate;
- attaching an active component part to the substrate, wherein the active component part includes a laser and a photodiode; and
- attaching a circulator on the substrate such that a first port of the circulator is coupled with the laser and wherein a second port of the circulator is coupled with the photodiode, wherein the circulator includes:
  - a garnet that is disposed between a first wedge and a second wedge; and
  - a magnet that at least partially encloses the garnet, the first wedge, and the second wedge.

14. The method as set forth in claim 13, further comprising coupling the first port to the laser through free space.

15. The method as set forth in claim 13, further comprising coupling the first port to the laser thorough free space and coupling the second port to the photodiode through a fiber optic pigtail.

16. The method as set forth in claim 13, further comprising coupling the laser to the circulator through a polarization maintaining fiber-optic pigtail.

17. The method as set forth in claim 13, wherein attaching an active component part to the substrate further comprises fabricating the active component part monolithically onto the substrate.

18. The method as set forth in claim 13, wherein attaching an active component part to the substrate further comprises attaching discrete components to the substrate.

19. A transceiver module for both transmitting and receiving optical data over single fiber-optic cable in a fiber-optic network, the transceiver module comprising:
- an active component part including a laser diode and a photo diode disposed on a substrate that are separated by a distance, wherein the distance between the laser diode and the photo diode determines a length of the transceiver module; and
- a core that is connected to the laser diode over a polarization maintaining fiber and to the photo diode over a single mode fiber, wherein the core transmits light from the laser diode to a fiber optic cable over a first path through the core and transmits light received from the fiber optic cable to the photo diode over a second path through the core, wherein the core includes a garnet that is disposed between a first wedge and a second wedge.

20. A transceiver module as defined in claim 19, wherein the distance between the laser diode and the photo diode is less than 300 microns.

21. A transceiver module as defined in claim 19, wherien the distance between the laser diode and the photo diode is about 200 microns.

22. A transceiver module as defined in claim 19, wherien the length of the transceiver module is less than 0.75 inches.

23. A transceiver module as defined in claim 19, wherien the length of the transceiver module is about 0.5 inches.

24. A transceiver module as defined in claim 19, wherein the core is enclosed by a magnet.

25. A transceiver module as defined in claim 19, wherein the core further comprises:
- a first lens disposed between the first wedge and the active component part; and
- a second lens disposed between the second wedge and the fiber optic cable.

* * * * *